US008048515B2

(12) United States Patent  
Nishiwaki et al.

(10) Patent No.: US 8,048,515 B2  
(45) Date of Patent: Nov. 1, 2011

(54) GRAPHITE MATERIAL AND A METHOD OF PRODUCING GRAPHITE MATERIAL

(75) Inventors: Toshiyuki Nishiwaki, Gifu (JP); Masahiro Yasuda, Gifu (JP); Toshiki Ito, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 817 days.

(21) Appl. No.: 12/132,057

(22) Filed: Jun. 3, 2008

(65) Prior Publication Data

US 2008/0305319 A1    Dec. 11, 2008

(30) Foreign Application Priority Data

Jun. 7, 2007    (JP) ................................ 2007-151661  
Mar. 31, 2008  (JP) ................................ 2008-092704

(51) Int. Cl.
*C01B 31/00*  (2006.01)  
*C01B 31/02*  (2006.01)  
*A61F 13/15*  (2006.01)  
*B32B 3/00*   (2006.01)  
*B32B 3/26*   (2006.01)

(52) U.S. Cl. ............... 428/314.2; 264/29.5; 423/445 R; 423/448; 428/219; 428/314.8; 428/315.5; 428/315.7; 428/408

(58) Field of Classification Search ............. 264/29.5; 423/445 R, 448; 428/219, 314.2, 314.8, 428/315.5, 315.7  
See application file for complete search history.

(56) References Cited

U.S. PATENT DOCUMENTS

| 3,171,720 A | 3/1965 | Shea et al. |
| 4,412,675 A | 11/1983 | Kawakubo |
| 5,525,276 A | 6/1996 | Okuyama et al. |
| 2006/0133980 A1* | 6/2006 | Nanba et al. ............. 423/445 R |

FOREIGN PATENT DOCUMENTS

| DE | 873227 | 4/1953 |
| EP | 0146399 | 6/1985 |
| JP | 1-97523 | 4/1989 |
| JP | 7-14804 B2 | 2/1990 |
| JP | 4-240022 | 8/1992 |
| JP | 6-144811 | 5/1994 |
| WO | WO 2007/073793 | 7/2007 |

OTHER PUBLICATIONS

Office Action issued by the Korean Patent office on Mar. 18, 2010.  
Poco Graphite, Inc., "Properties and Characteristics of Graphite for Industrial Applications", Nov. 2001, XP-002598686.  
Database WPI Week 198921, Thomson Scientific, London, GB; AN 1989-155745, XP-002599557.  
Database WPI Week 199241, Thomson Scientific, London, GB; AN 1992-336011, XP-002599558.  
Extended European Search Report for corresponding EP Application No. 08010260.1-1213, Sep. 21, 2010.

* cited by examiner

*Primary Examiner* — Jennifer McNeil  
*Assistant Examiner* — Jonathan Langman  
(74) *Attorney, Agent, or Firm* — Ditthavong Mori & Steiner, P.C.

(57) ABSTRACT

A graphite material includes a plurality of graphite particles and a plurality of pores which form a microstructure. When a cross-section of the microstructure is observed with a scanning electron microscope, the number of the pores appearing on the cross-section is more than 250 or more per 6000 μm$^2$, an average area of the pores appearing on the cross-section is 5 μm$^2$ or less, and an average aspect ratio of the pores appearing on the cross-section is 0.55 or less.

19 Claims, 12 Drawing Sheets

| NO. | PARTICLE SIZE (μm) | FREQUENCY (%) | INTEGRATED VALUE (%) | NO. | PARTICLE SIZE (μm) | FREQUENCY (%) | INTEGRATED VALUE (%) |
|---|---|---|---|---|---|---|---|
| 1 | 0.115 | 0.000 | 0.000 | 32 | 7.697 | 9.645 | 54.072 |
| 2 | 0.131 | 0.000 | 0.000 | 33 | 8.816 | 10.231 | 64.303 |
| 3 | 0.150 | 0.000 | 0.000 | 34 | 10.097 | 10.026 | 74.329 |
| 4 | 0.172 | 0.000 | 0.000 | 35 | 11.565 | 8.564 | 82.894 |
| 5 | 0.197 | 0.000 | 0.000 | 36 | 13.246 | 6.685 | 89.579 |
| 6 | 0.226 | 0.000 | 0.000 | 37 | 15.172 | 4.861 | 94.440 |
| 7 | 0.259 | 0.000 | 0.000 | 38 | 17.377 | 2.852 | 97.291 |
| 8 | 0.296 | 0.000 | 0.000 | 39 | 19.904 | 1.549 | 98.840 |
| 9 | 0.339 | 0.000 | 0.000 | 40 | 22.797 | 0.741 | 99.581 |
| 10 | 0.389 | 0.000 | 0.000 | 41 | 26.111 | 0.294 | 99.876 |
| 11 | 0.445 | 0.000 | 0.000 | 42 | 29.907 | 0.124 | 100.000 |
| 12 | 0.510 | 0.000 | 0.000 | 43 | 34.255 | 0.000 | 100.000 |
| 13 | 0.584 | 0.000 | 0.000 | 44 | 39.234 | 0.000 | 100.000 |
| 14 | 0.669 | 0.000 | 0.000 | 45 | 44.938 | 0.000 | 100.000 |
| 15 | 0.766 | 0.000 | 0.000 | 46 | 51.471 | 0.000 | 100.000 |
| 16 | 0.877 | 0.000 | 0.000 | 47 | 58.953 | 0.000 | 100.000 |
| 17 | 1.005 | 0.000 | 0.000 | 48 | 67.523 | 0.000 | 100.000 |
| 18 | 1.151 | 0.000 | 0.000 | 49 | 77.339 | 0.000 | 100.000 |
| 19 | 1.318 | 0.000 | 0.000 | 50 | 88.583 | 0.000 | 100.000 |
| 20 | 1.510 | 0.131 | 0.131 | 51 | 101.460 | 0.000 | 100.000 |
| 21 | 1.729 | 0.380 | 0.511 | 52 | 116.210 | 0.000 | 100.000 |
| 22 | 1.981 | 1.005 | 1.516 | 53 | 133.103 | 0.000 | 100.000 |
| 23 | 2.269 | 2.036 | 3.552 | 54 | 152.453 | 0.000 | 100.000 |
| 24 | 2.599 | 2.851 | 6.403 | 55 | 174.616 | 0.000 | 100.000 |
| 25 | 2.976 | 3.108 | 9.510 | 56 | 200.000 | 0.000 | 100.000 |
| 26 | 3.409 | 3.398 | 12.909 | | | | |
| 27 | 3.905 | 4.290 | 17.198 | | | | |
| 28 | 4.472 | 5.566 | 22.765 | | | | |
| 29 | 5.122 | 6.460 | 29.224 | | | | |
| 30 | 5.867 | 7.049 | 36.273 | | | | |
| 31 | 6.720 | 8.154 | 44.427 | | | | |

| NO. | PARTICLE SIZE (μm) | FREQUENCY (%) | INTEGRATED VALUE (%) | NO. | PARTICLE SIZE (μm) | FREQUENCY (%) | INTEGRATED VALUE (%) |
|---|---|---|---|---|---|---|---|
| 1 | 0.115 | 0.000 | 0.000 | 32 | 7.697 | 8.613 | 49.814 |
| 2 | 0.131 | 0.000 | 0.000 | 33 | 8.816 | 9.339 | 59.153 |
| 3 | 0.150 | 0.000 | 0.000 | 34 | 10.097 | 9.478 | 68.630 |
| 4 | 0.172 | 0.000 | 0.000 | 35 | 11.565 | 8.598 | 77.228 |
| 5 | 0.197 | 0.000 | 0.000 | 36 | 13.246 | 7.297 | 84.524 |
| 6 | 0.226 | 0.000 | 0.000 | 37 | 15.172 | 5.899 | 90.424 |
| 7 | 0.259 | 0.000 | 0.000 | 38 | 17.377 | 4.036 | 94.460 |
| 8 | 0.296 | 0.000 | 0.000 | 39 | 19.904 | 2.615 | 97.075 |
| 9 | 0.339 | 0.000 | 0.000 | 40 | 22.797 | 1.538 | 98.613 |
| 10 | 0.389 | 0.000 | 0.000 | 41 | 26.111 | 0.778 | 99.392 |
| 11 | 0.445 | 0.000 | 0.000 | 42 | 29.907 | 0.409 | 99.801 |
| 12 | 0.510 | 0.000 | 0.000 | 43 | 34.255 | 0.199 | 100.000 |
| 13 | 0.584 | 0.000 | 0.000 | 44 | 39.234 | 0.000 | 100.000 |
| 14 | 0.669 | 0.000 | 0.000 | 45 | 44.938 | 0.000 | 100.000 |
| 15 | 0.766 | 0.000 | 0.000 | 46 | 51.471 | 0.000 | 100.000 |
| 16 | 0.877 | 0.000 | 0.000 | 47 | 58.953 | 0.000 | 100.000 |
| 17 | 1.005 | 0.000 | 0.000 | 48 | 67.523 | 0.000 | 100.000 |
| 18 | 1.151 | 0.000 | 0.000 | 49 | 77.339 | 0.000 | 100.000 |
| 19 | 1.318 | 0.000 | 0.000 | 50 | 88.583 | 0.000 | 100.000 |
| 20 | 1.510 | 0.214 | 0.214 | 51 | 101.460 | 0.000 | 100.000 |
| 21 | 1.729 | 0.546 | 0.760 | 52 | 116.210 | 0.000 | 100.000 |
| 22 | 1.981 | 1.260 | 2.020 | 53 | 133.103 | 0.000 | 100.000 |
| 23 | 2.269 | 2.250 | 4.271 | 54 | 152.453 | 0.000 | 100.000 |
| 24 | 2.599 | 2.829 | 7.099 | 55 | 174.616 | 0.000 | 100.000 |
| 25 | 2.976 | 2.881 | 9.981 | 56 | 200.000 | 0.000 | 100.000 |
| 26 | 3.409 | 3.079 | 13.060 | | | | |
| 27 | 3.905 | 3.872 | 16.932 | | | | |
| 28 | 4.472 | 5.020 | 21.952 | | | | |
| 29 | 5.122 | 5.772 | 27.724 | | | | |
| 30 | 5.867 | 6.257 | 33.981 | | | | |
| 31 | 6.720 | 7.220 | 41.201 | | | | |

| NO. | PARTICLE SIZE (μm) | FREQUENCY (%) | INTEGRATED VALUE (%) | NO. | PARTICLE SIZE (μm) | FREQUENCY (%) | INTEGRATED VALUE (%) |
|---|---|---|---|---|---|---|---|
| 1 | 0.115 | 0.228 | 0.228 | 32 | 7.697 | 5.665 | 78.637 |
| 2 | 0.131 | 0.348 | 0.576 | 33 | 8.816 | 5.273 | 83.910 |
| 3 | 0.150 | 0.426 | 1.001 | 34 | 10.097 | 4.729 | 88.639 |
| 4 | 0.172 | 0.507 | 1.508 | 35 | 11.565 | 3.863 | 92.502 |
| 5 | 0.197 | 0.593 | 2.101 | 36 | 13.246 | 2.923 | 95.426 |
| 6 | 0.226 | 0.701 | 2.802 | 37 | 15.172 | 2.094 | 97.520 |
| 7 | 0.259 | 0.823 | 3.625 | 38 | 17.377 | 1.265 | 98.784 |
| 8 | 0.296 | 0.840 | 4.465 | 39 | 19.904 | 0.710 | 99.494 |
| 9 | 0.339 | 0.832 | 5.297 | 40 | 22.797 | 0.354 | 99.848 |
| 10 | 0.389 | 0.744 | 6.041 | 41 | 26.111 | 0.152 | 100.000 |
| 11 | 0.445 | 0.646 | 6.687 | 42 | 29.907 | 0.000 | 100.000 |
| 12 | 0.510 | 0.549 | 7.236 | 43 | 34.255 | 0.000 | 100.000 |
| 13 | 0.584 | 0.495 | 7.731 | 44 | 39.234 | 0.000 | 100.000 |
| 14 | 0.669 | 0.476 | 8.207 | 45 | 44.938 | 0.000 | 100.000 |
| 15 | 0.766 | 0.506 | 8.713 | 46 | 51.471 | 0.000 | 100.000 |
| 16 | 0.877 | 0.597 | 9.310 | 47 | 58.953 | 0.000 | 100.000 |
| 17 | 1.005 | 0.752 | 10.062 | 48 | 67.523 | 0.000 | 100.000 |
| 18 | 1.151 | 0.989 | 11.051 | 49 | 77.339 | 0.000 | 100.000 |
| 19 | 1.318 | 1.348 | 12.399 | 50 | 88.583 | 0.000 | 100.000 |
| 20 | 1.510 | 1.951 | 14.349 | 51 | 101.460 | 0.000 | 100.000 |
| 21 | 1.729 | 2.915 | 17.264 | 52 | 116.210 | 0.000 | 100.000 |
| 22 | 1.981 | 4.218 | 21.482 | 53 | 133.103 | 0.000 | 100.000 |
| 23 | 2.269 | 5.400 | 26.883 | 54 | 152.453 | 0.000 | 100.000 |
| 24 | 2.599 | 5.762 | 32.645 | 55 | 174.616 | 0.000 | 100.000 |
| 25 | 2.976 | 5.514 | 38.158 | 56 | 200.000 | 0.000 | 100.000 |
| 26 | 3.409 | 5.422 | 43.580 | | | | |
| 27 | 3.905 | 5.710 | 49.289 | | | | |
| 28 | 4.472 | 6.071 | 55.360 | | | | |
| 29 | 5.122 | 6.036 | 61.396 | | | | |
| 30 | 5.867 | 5.830 | 67.227 | | | | |
| 31 | 6.720 | 5.746 | 72.972 | | | | |

| NO. | PARTICLE SIZE (μm) | FREQUENCY (%) | INTEGRATED VALUE (%) | NO. | PARTICLE SIZE (μm) | FREQUENCY (%) | INTEGRATED VALUE (%) |
|---|---|---|---|---|---|---|---|
| 1 | 0.115 | 0.000 | 0.000 | 32 | 7.697 | 2.159 | 15.244 |
| 2 | 0.131 | 0.000 | 0.000 | 33 | 8.816 | 2.498 | 17.742 |
| 3 | 0.150 | 0.000 | 0.000 | 34 | 10.097 | 2.894 | 20.636 |
| 4 | 0.172 | 0.000 | 0.000 | 35 | 11.565 | 3.313 | 23.949 |
| 5 | 0.197 | 0.000 | 0.000 | 36 | 13.246 | 3.938 | 27.887 |
| 6 | 0.226 | 0.000 | 0.000 | 37 | 15.172 | 4.763 | 32.650 |
| 7 | 0.259 | 0.000 | 0.000 | 38 | 17.377 | 5.582 | 38.232 |
| 8 | 0.296 | 0.000 | 0.000 | 39 | 19.904 | 6.422 | 44.654 |
| 9 | 0.339 | 0.000 | 0.000 | 40 | 22.797 | 7.077 | 51.731 |
| 10 | 0.389 | 0.000 | 0.000 | 41 | 26.111 | 7.458 | 59.190 |
| 11 | 0.445 | 0.000 | 0.000 | 42 | 29.907 | 7.504 | 66.694 |
| 12 | 0.510 | 0.000 | 0.000 | 43 | 34.255 | 7.161 | 73.855 |
| 13 | 0.584 | 0.000 | 0.000 | 44 | 39.234 | 6.475 | 80.330 |
| 14 | 0.669 | 0.000 | 0.000 | 45 | 44.938 | 5.607 | 85.937 |
| 15 | 0.766 | 0.000 | 0.000 | 46 | 51.471 | 4.493 | 90.429 |
| 16 | 0.877 | 0.000 | 0.000 | 47 | 58.953 | 3.243 | 93.672 |
| 17 | 1.005 | 0.000 | 0.000 | 48 | 67.523 | 2.222 | 95.894 |
| 18 | 1.151 | 0.000 | 0.000 | 49 | 77.339 | 1.430 | 97.324 |
| 19 | 1.318 | 0.000 | 0.000 | 50 | 88.583 | 0.914 | 98.238 |
| 20 | 1.510 | 0.109 | 0.109 | 51 | 101.460 | 0.593 | 98.831 |
| 21 | 1.729 | 0.251 | 0.360 | 52 | 116.210 | 0.376 | 99.207 |
| 22 | 1.981 | 0.541 | 0.901 | 53 | 133.103 | 0.276 | 99.483 |
| 23 | 2.269 | 0.923 | 1.824 | 54 | 152.453 | 0.224 | 99.706 |
| 24 | 2.599 | 1.101 | 2.925 | 55 | 174.616 | 0.164 | 99.871 |
| 25 | 2.976 | 1.065 | 3.990 | 56 | 200.000 | 0.129 | 100.000 |
| 26 | 3.409 | 1.097 | 5.087 | | | | |
| 27 | 3.905 | 1.302 | 6.389 | | | | |
| 28 | 4.472 | 1.592 | 7.981 | | | | |
| 29 | 5.122 | 1.674 | 9.655 | | | | |
| 30 | 5.867 | 1.632 | 11.287 | | | | |
| 31 | 6.720 | 1.797 | 13.085 | | | | |

GRAPHITE MATERIAL AND A METHOD OF PRODUCING GRAPHITE MATERIAL

CROSS-REFERENCE TO RELATED APPLICATION

This application claims priority from Japanese Patent Application No. 2007-151661, filed on Jun. 7, 2007, and priority from Japanese Patent Application No. 2008-092704, filed on Mar. 31, 2008, the contents of which are incorporated herein by reference in their entirety.

BACKGROUND OF THE INVENTION

1. Field of the Invention

The present invention relates to a graphite material and a process for producing the same.

2. Discussion of the Background

Since graphite materials are excellent in chemical stability, thermal resistance, processing characteristic, and the like, the materials have been used in many fields including an electrode for electric discharging, a jig for glass-sealing and brazing of electronic parts and an elastic body. Recently, with miniaturization of home electric appliances and automobile parts, precise processing to form thin ribs and grooves, thin pins, fine holes, and the like is performed to molds for use in die-casting and plastic molding. For the purpose of preparing such precise molds, an electrode for electric discharging comprising a graphite material which can be precisely processed has been needed.

For obtaining a precise form such as a thin rib by electric discharging using a graphite material as an electrode without breaking the electrode, it is necessary for the graphite material to have some degree of strength. Moreover, in order to enhance dimensional accuracy of a mold to be processed, it is important for the graphite material not to be deformed by heat and external force during electric discharging.

As a high-strength and high-density graphite material suitable for such an application, JP-A-1-97523 describes to use mesocarbon microbeads as a raw material. As another means for producing a high-density and high-strength graphite material, JP-A-4-240022 describes to mold mesocarbon microbeads having specific β resin content, ash content, water content, volatile content, fixed carbon, and average particle diameter as a raw material under cold press, and burning and graphitize it at a predetermined temperature. Since the graphite materials obtained by production processes described in JP-A-1-97523 and JP-A-4-240022 have high strength and high density, it is advantageous that the materials are difficult to break even when they are processed into a precise form such as a thin rib. The contents of JP-A-1-97523 and JP-A-4-240022 are incorporated herein by reference in their entirety.

Meanwhile, JP-A-6-144811 describes a carbonaceous coil spring in order to remedy a disadvantage of conventional springs such as a metal spring and a ceramic spring. That is, a metal spring has a large temperature dependency in the spring constant and thus is generally used at 200° C. or lower, and its thermal resistance is also limited to 600° C. and the strength rapidly decreases above the temperature. Moreover, the metal spring is poor in corrosion resistance against rust and chemicals. The thermal resistance of a ceramic spring is also limited to 1000° C. and the thermal shock resistance of the ceramic spring is poor. Since both of metal and ceramic have high specific gravity, it is disadvantageous that a device having the metal or ceramic spring incorporated therein has a large weight.

The method for obtaining the carbonaceous coil spring described in JP-A-6-144811 includes: forming an organic material capable of carbonization or an organic string body, which contains carbon fibers, graphite whiskers, graphite powders, amorphous carbon powders, or the like homogeneously dispersed therein and is highly reinforced, into a coil shape; subjecting it to a carbon precursor treatment as needed; carbonizing it through a heating treatment in an inert atmosphere; and covering the whole surface of the carbonized spring with a metal corresponding to a desired function. The carbonaceous coil spring has excellent thermal resistance and corrosion resistance even at a high temperature in the presence of oxygen and is expected to have high strength and reliability.

SUMMARY OF THE INVENTION

According to an aspect of the present invention, there is provided a graphite material including a plurality of graphite particles and a plurality of pores which form a microstructure. When a cross-section of the microstructure is observed with a scanning electron microscope, the number of the pores appearing on the cross-section is 250 or more per 6000 $\mu m^2$, an average area of the pores appearing on the cross-section is 5 $\mu m^2$ or less, and an average aspect ratio of the pores appearing on the cross-section is 0.55 or less.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

First Embodiment

Figures 1A, 1B:
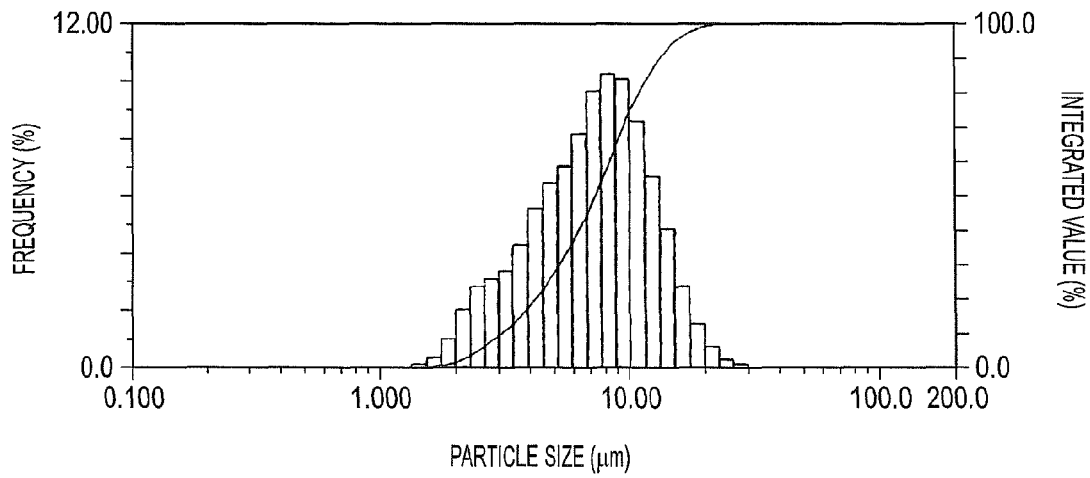
FIG. 1A is shows a graph of particle size distribution of a secondary raw material powder used in Example 1.
FIG. 1B shows values of particle size distribution of the secondary raw material powder used in Example 1.
Figures 2A, 2B:
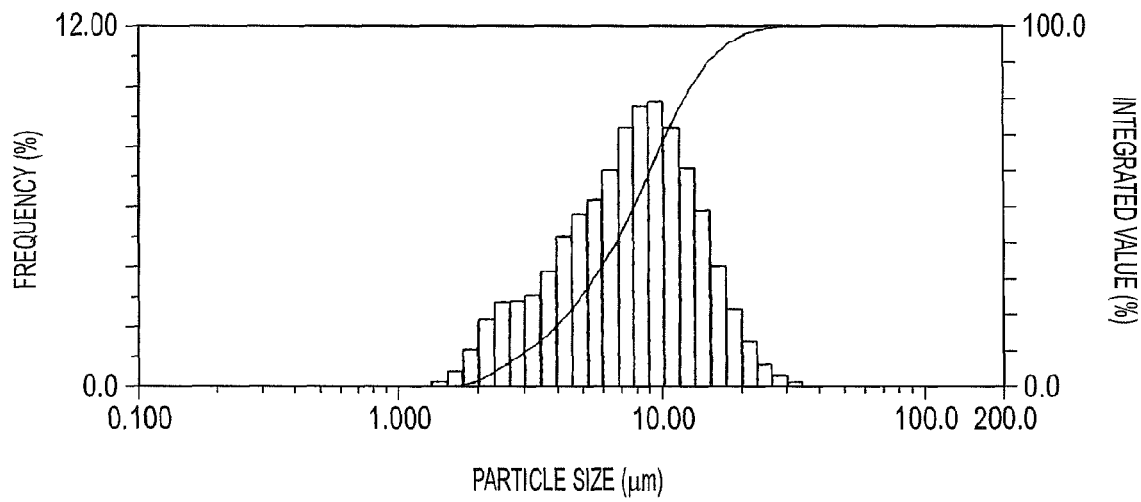
FIG. 2A shows a graph of particle size distribution of a secondary raw material powder used in Example 2.
FIG. 2B shows values of particle size distribution of the secondary raw material powder used in Example 2.
Figures 3A, 3B:
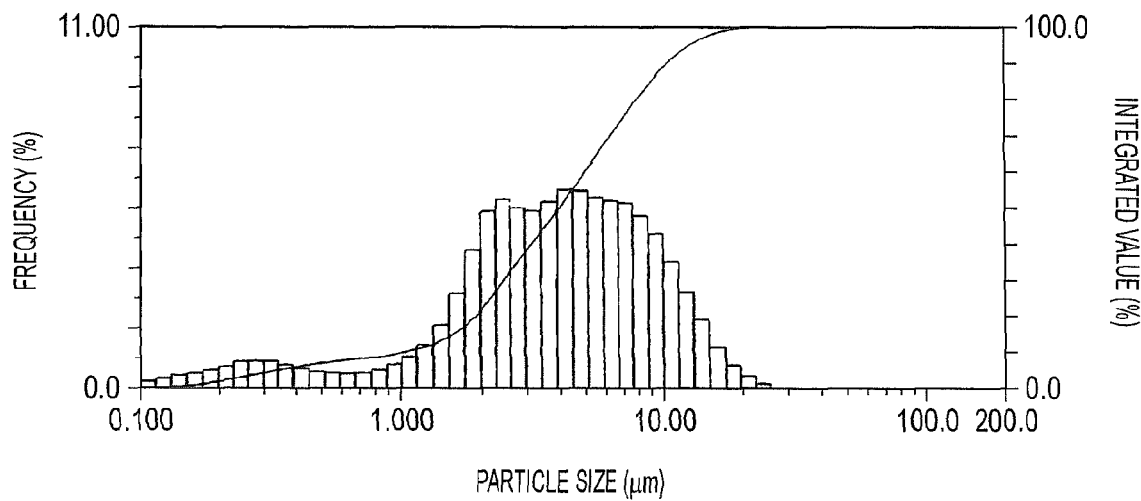
FIG. 3A shows a graph of particle size distribution of a secondary raw material powder used in Comparative Example 1.
FIG. 3B shows values of particle size distribution of the secondary raw material powder used in Comparative Example 1.
Figures 4A, 4B:
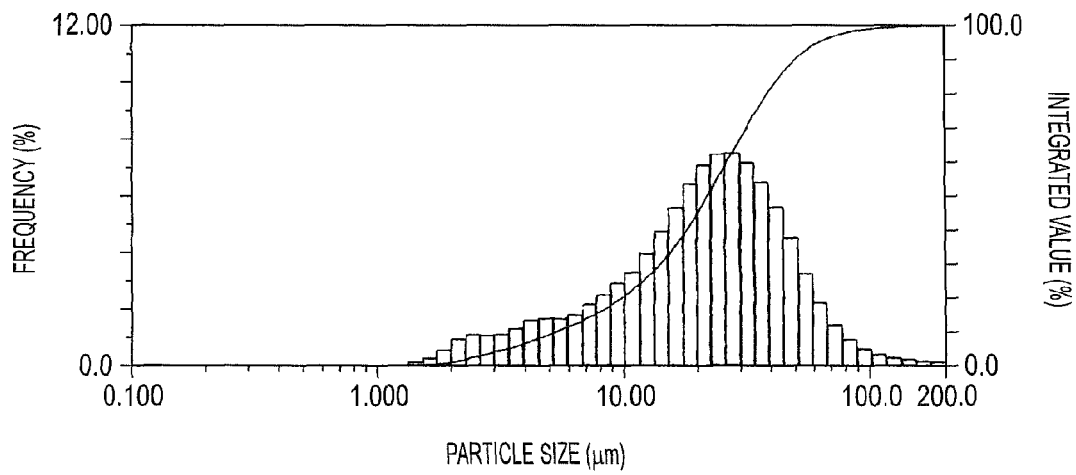
FIG. 4A shows a graph of particle size distribution of a secondary raw material powder used in Comparative Example 2.
FIG. 4B shows values of particle size distribution of the secondary raw material powder used in Comparative Example 2.
Figure 5A:
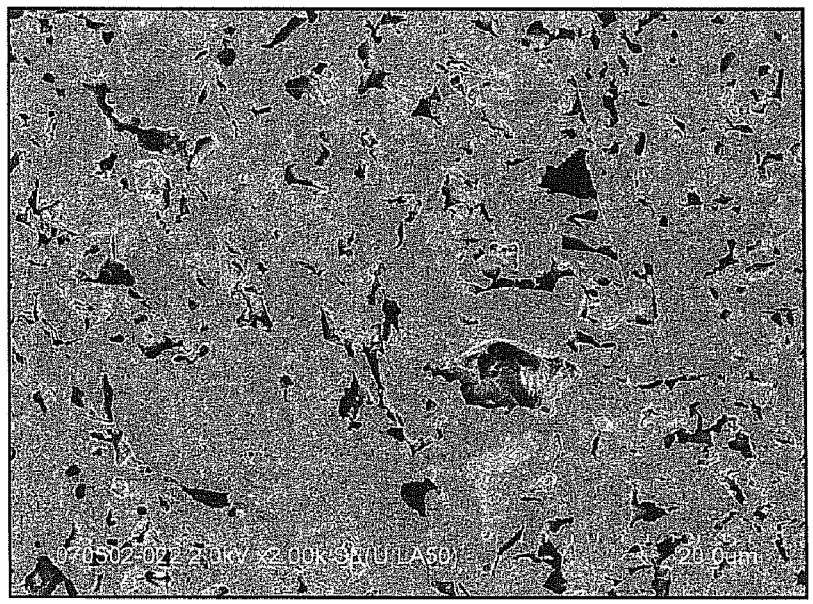
FIG. 5A shows a cross-sectional SEM photograph of the graphite material prepared in Example 1.
Figure 5B:
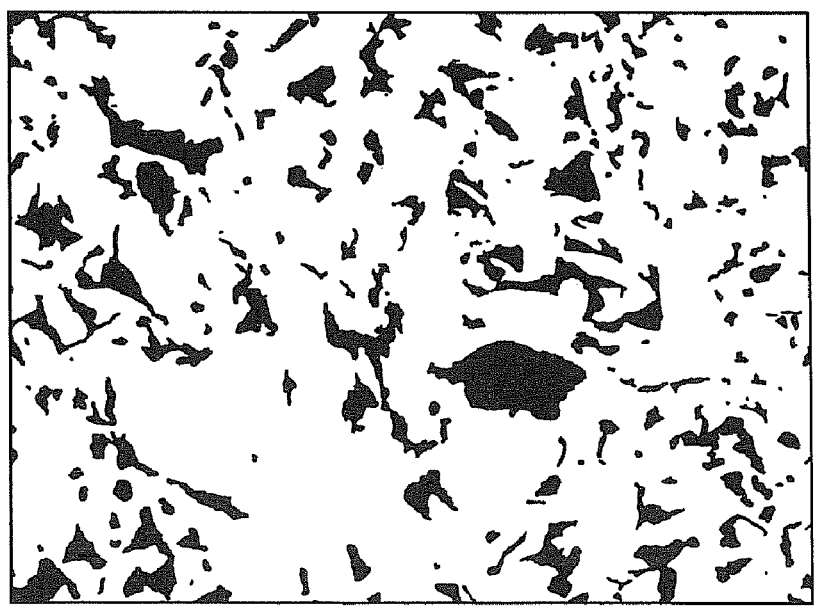
FIG. 5B shows a binarized image obtained by image-processing of the cross-sectional SEM photograph of the graphite material prepared in Example 1.
Figure 5C:
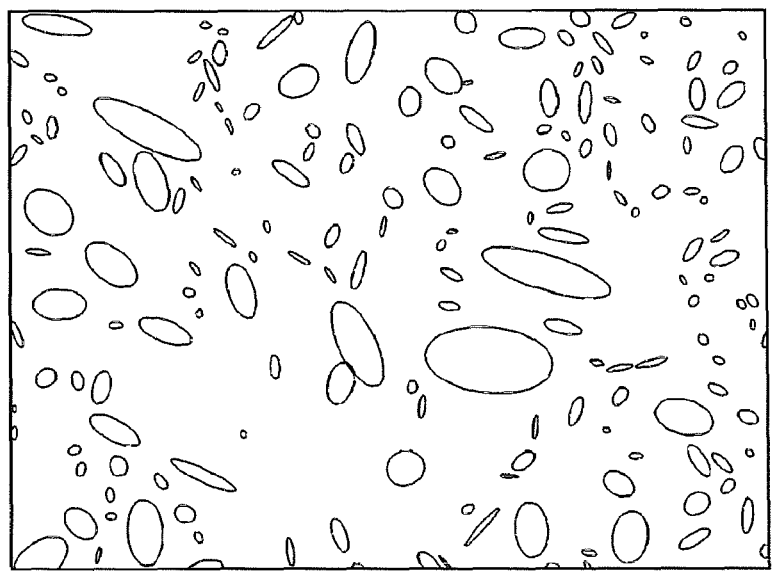
FIG. 5C shows an elliptic fitting drawing of a binarized image obtained by image-processing of the cross-sectional SEM photograph of the graphite material prepared in Example 1.
Figure 6A:
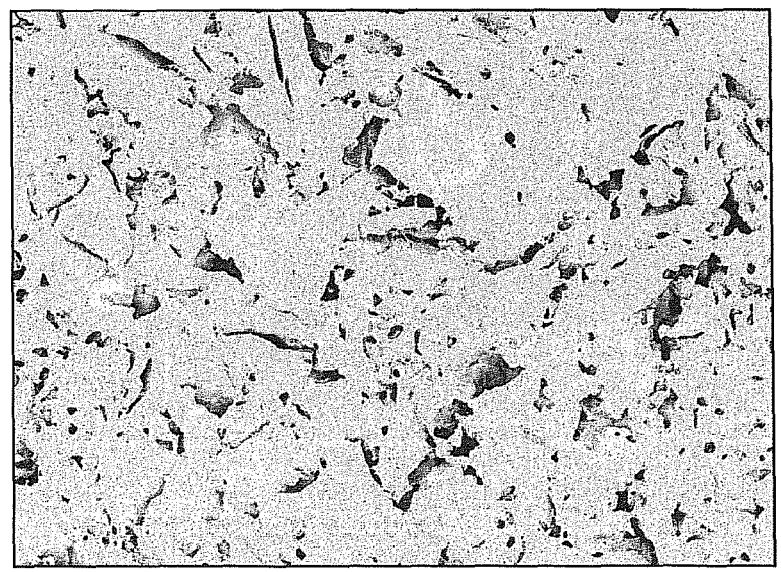
FIG. 6A shows a cross-sectional SEM photograph of the graphite material prepared in Example 2.
Figure 6B:
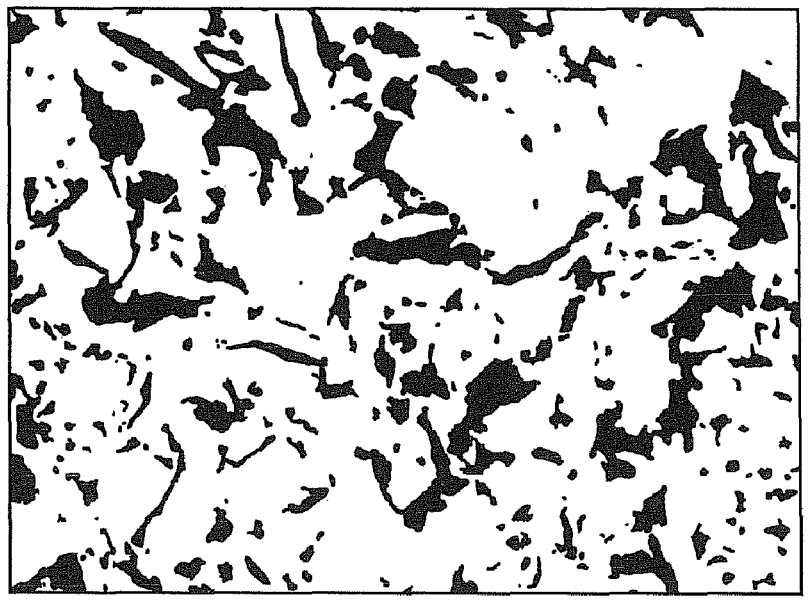
FIG. 6B shows a binarized image obtained by image-processing of the cross-sectional SEM photograph of the graphite material prepared in Example 2.
Figure 6C:
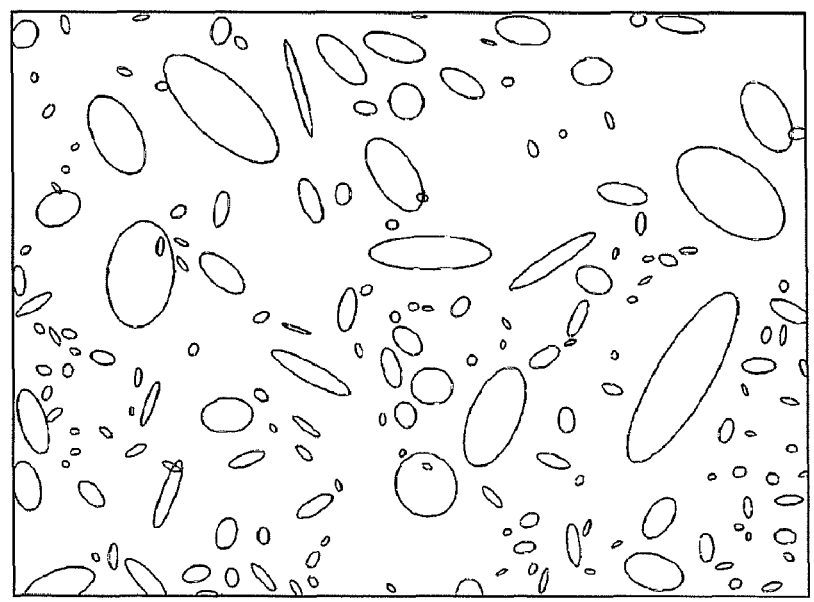
FIG. 6C shows an elliptic fitting drawing of a binarized image obtained by image-processing of the cross-sectional SEM photograph of the graphite material prepared in Example 2.
Figure 7A:
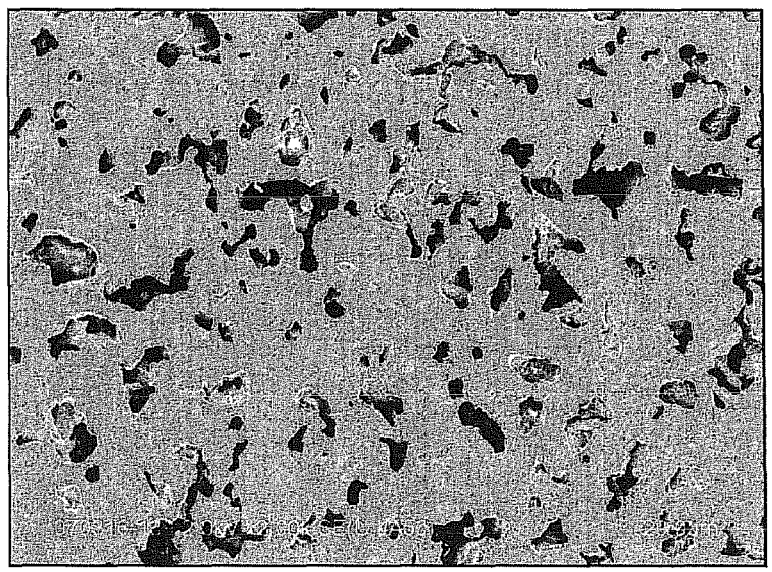
FIG. 7A shows a cross-sectional SEM photograph of the graphite material prepared in Comparative Example 1.
Figure 7B:
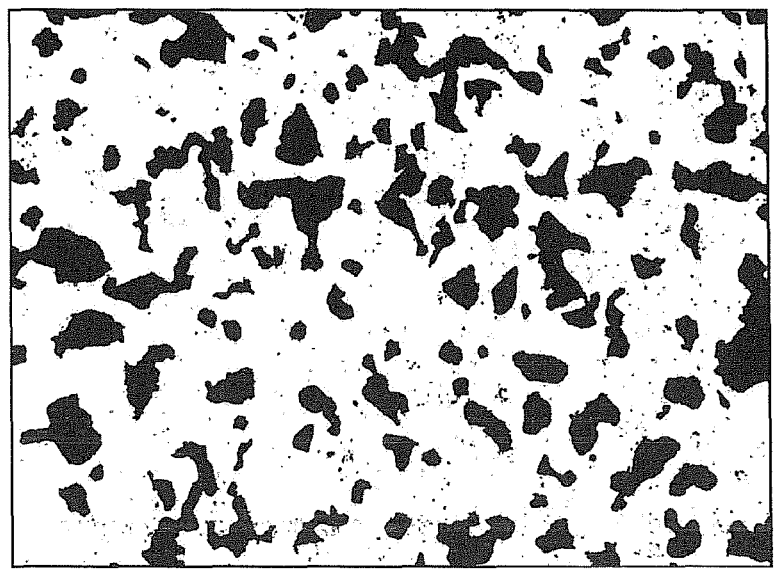
FIG. 7B shows a binarized image obtained by image-processing of the cross-sectional SEM photograph of the graphite material prepared in Comparative Example 1.
Figure 7C:
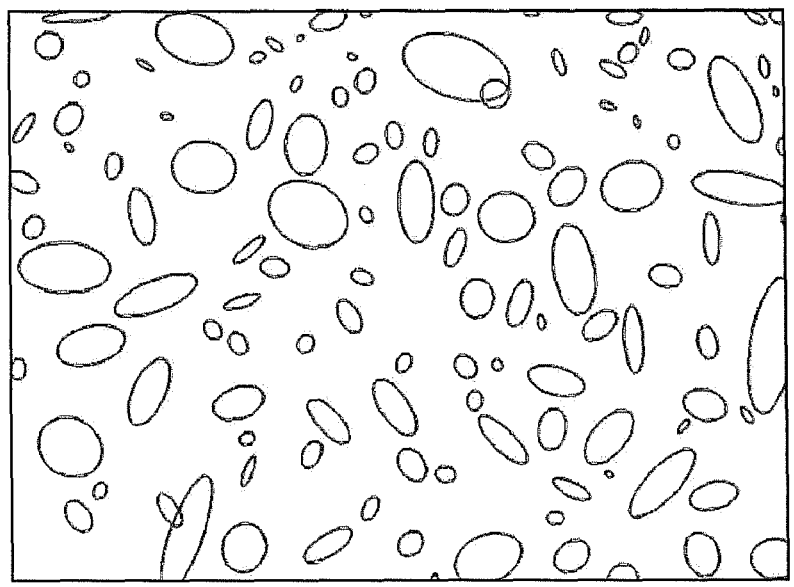
FIG. 7C shows an elliptic fitting drawing of a binarized image obtained by image-processing of the cross-sectional SEM photograph of the graphite material prepared in Comparative Example 1.
Figure 8A:
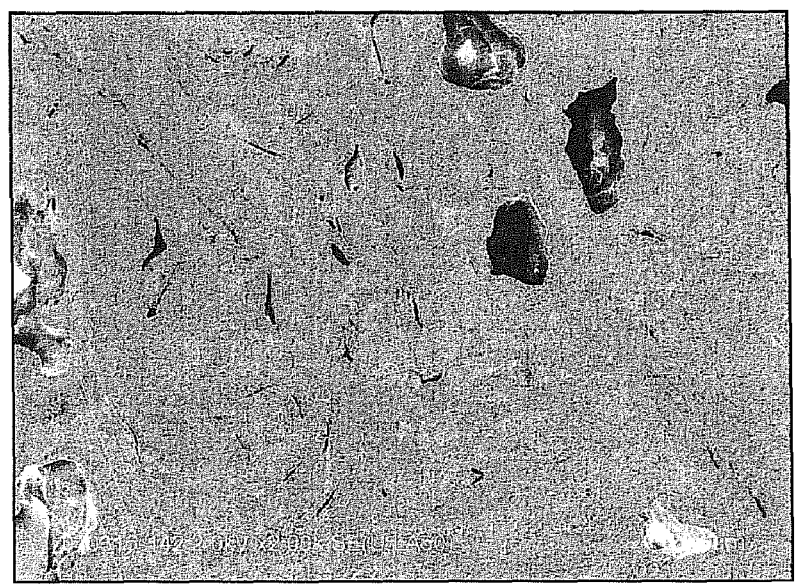
FIG. 8A shows a cross-sectional SEM photograph of the graphite material prepared in Comparative Example 2.
Figure 8B:
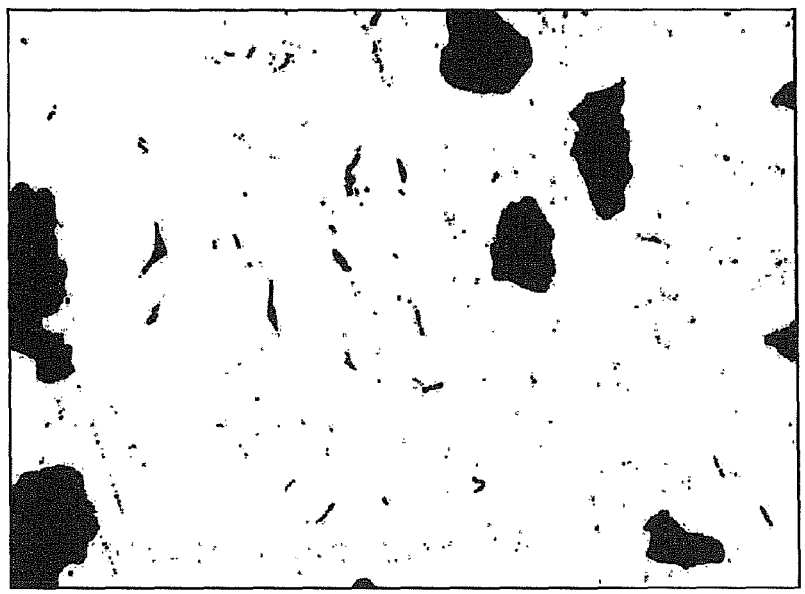
FIG. 8B shows a binarized image obtained by image-processing of the cross-sectional SEM photograph of the graphite material prepared in Comparative Example 2.
Figure 8C:
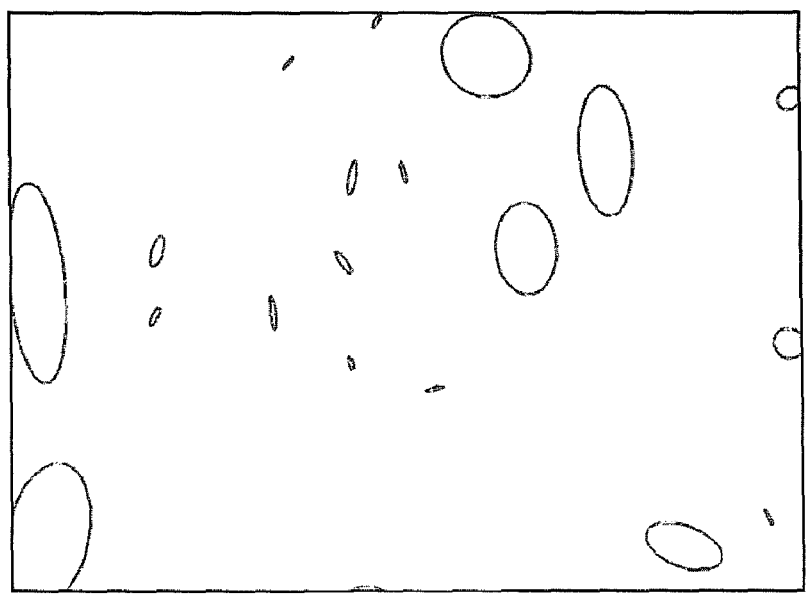
FIG. 8C shows an elliptic fitting drawing of a binarized image obtained by image-processing of the cross-sectional SEM photograph of the graphite material prepared in Comparative Example 2.

The embodiments will now be described with reference to the accompanying drawings, wherein like reference numerals designate corresponding or identical elements throughout the various drawings. The following will describe embodiments of the graphite material according to the present invention in detail.

Since conventional graphite materials have high strength and high density, cutting resistance with a cutting tool during processing is large and chipping often occurs. Moreover, since the cutting resistance with a cutting tool is high, in the case of processing a thin rib and a fine pin, the graphite material is deformed by a reaction force, and therefore, accuracy in thickness decreases. Furthermore, also in the case where inner faces or bottom faces of small frames having a small corner R, thin grooves, deep fine holes, and the like are processed using an end mill or a drill, the end mill or drill deforms, and therefore, not only processing of high accuracy cannot be achieved but also breakage of the cutting tool is caused.

The prevention of these problems is principally possible by decreasing an amount of one cutting by a cutting tool. However, for doing this, it is necessary to take a countermeasure, that is, decrease an advancing rate of the cutting tool or increase rotation number of the cutting tool. In such a method, it is necessary to use high-performance processing machine and cutting tool having a high rigidity which does not generate sway of the center even at high-speed rotation and also the processing takes more time.

Furthermore, in the case where a conventional graphite material is used as an electrode for electric discharging for finish processing, a graphite material generally has a relation that consume of the electrode decreases as shore hardness thereof increases. Therefore, a graphite material obtained at a low graphitization temperature and having a high shore hardness is advantageous. However, a graphite material having a high shore hardness also has high cutting resistance and rapidly consumes the cutting tool.

Meanwhile, in the case of the conventional carbonaceous coil spring, it is difficult to form a spring with a high accuracy since the process of carbonization of the organic string body involves a size contraction. Moreover, since the carbon material formed by such a method is a glassy carbon having a high hardness, it is difficult to set its shape by post-processing. It is noted that it is conceivable to process widely used isotropic graphite material into a predetermined shape such as a coil shape to make a spring. However, since pores in the isotropic graphite material is generally flat and large, a crack may easily develop from an edge part of the flat pores to lead to breakage of the spring, so that the widely used isotropic graphite material is not suitable as material for a spring.

According to an embodiment of the present invention, a graphite material and a method for producing such a graphite material may be provided, which has a high strength and a high density and also excellent in processing characteristic.

As a result of extensive studies in consideration of the above and according to the embodiment of the present invention, a graphite material having a specific structure enables processing with good accuracy without breaking cutting tools in the precise processing of thin ribs, thin pins, narrow grooves, fine holes, and the like.

The graphite material according to the above has a fine structure wherein the number of the pores appearing on a cross-section is 250 or more per 6000 $\mu m^2$, average area of the pores appearing on the cross-section is 5 $\mu m^2$ or less, and average aspect ratio of the pores appearing on the cross-section is 0.55 or less as well as fine graphite particles and the pores are homogeneously distributed. Therefore, the material has a high strength and a high elastic modulus as well as excellent in processing characteristic. Therefore, at the time when precise processing for a thin rib and the like is performed using the graphite material according to the above as an electrode for electric discharging, processing can be performed with good accuracy without breaking the graphite material and cutting tools. Moreover, since the graphite material according to the above enables fine processing and also attrition at the electric discharging is small, a mold having a fine pattern can be easily produced and thus the material is advantageous as an electrode for electric discharging in finish processing.

According to an embodiment of the present invention, there is provided a graphite material including a plurality of graphite particles and a plurality of pores which form a microstructure. When a cross-section of the microstructure is observed with a scanning electron microscope, the number of the pores appearing on the cross-section is 250 or more per 6000 $\mu m^2$, and an average area of the pores appearing on the cross-section is 5 $\mu m^2$ or less. According to the above, the pores distributed in the graphite material are sufficiently small and the number of the pores present per unit volume of the graphite material is sufficiently large. Therefore, chipping in a large particle unit does not occur and a smooth processed surface can be obtained. Moreover, since the pores are very small as compared with the usual processed form applied to the graphite material, occurrence of fracture caused by the chipping of particles in the thin pin processing and crack and boring in the thin rib cutting can be reduced.

Additionally, when the cross-section of the microstructure is observed with the scanning electron microscope, an average aspect ratio of the pores appearing on the cross-section is 0.55 or less. According to this, the elastic modulus of the graphite material increases relative to compression strength by a cutting tool at processing. Therefore, the size of cutting chips generated at the processing can be reduced. Namely, cutting resistance of the cutting tool is small and thus processing becomes easy.

The above relation between the form of pores of the graphite material and the processing characteristics thereof is surmised to be due to the following mechanism.

At the cutting of a graphite material, compression force acts thereon in an advancing direction of a cutting tool. On this occasion, when strain energy accumulated with the advance of the cutting tool exceeds energy necessary for breakage, the material is cut. In order to obtain a smooth processed surface, it is necessary to process the material with discharging fine cutting powder and the occurrence of breakage is important prior to the accumulation of large strain energy.

In order not to accumulate the large strain energy, a small compression strength and a large elastic modulus are necessary. It is pointed out that the diameter of the particles to be cut has a positive correlation with the value of (compression strength)/(elastic modulus). From the above, in order to obtain a processed surface having a small (fine) particle diameter of particles to be cut, it is realized that a graphite material having a larger elastic modulus is advantageous.

The following will describe the relation between the elastic modulus of the graphite material and the shape of the pores. In general, the elastic modulus of a graphite material is represented by the following Knudsen's empirical equation:

$$E(P)=E(0)\exp(-bP)$$

where E(P): elastic modulus, P: porosity, and b: empirical constant.

The empirical constant b highly depends on the shape of the pores and it is known that the value is small in the case where the shape of the pores is spherical and the value rapidly increases as the shape changes through a flattened spheroid into a cracked pore shape ("Shin-Tanso Zairyo Nyumon" (Guide to Carbon Material), edited by The Carbon Society of Japan). Therefore, in order to increase the elastic modulus, a graphite material having a round shape (small aspect ratio) is advantageous.

From the above, it is considered that the relation between the shape of the pores of the graphite material and its processing characteristic is introduced. Namely, since the elastic modulus of the graphite material can be increased by making the shape of the pores round, i.e., the average aspect ratio of the pores appearing on the observed cross-section is made 0.55 or less, a fine-grained processed surface can be obtained, and therefore, a graphite material excellent in processing characteristic can be obtained.

Then, with regard to the compression strength, even when the pores are flattened spheroids or cracked pores, applied compression load acts so as to crash the pores, so that the shape of the pores does not affect the compression strength. The porosity affects the compression strength more.

When the porosity is small, the compression strength becomes high, and therefore, it becomes hard to cut the material and unevenness on the processed surface increases. When the porosity is large, the compression strength can be lowered but the resulting graphite material becomes soft so that it is easily broken or cracked even when fine processing is applied. Moreover, it is easily attrited in the electric discharging.

The porosity of the graphite material is highly correlated with its bulk density. In the case where the same raw material is used and it is subjected to the same graphitization treatment, the bulk density is about the same when the porosity is the same.

In the embodiment of the present invention, since pitch is mainly used as a starting material and the starting material and graphitization temperature fall within limited ranges although component(s) transformed through pitch cokes and component(s) directly carbonized and graphitized exist, the bulk density of the graphite material becomes from 1.78 to 1.86 g/cm$^3$, preferably 1.82 to 1.85 g/cm$^3$. In this connection, the bulk density according to the embodiment of present invention is obtained by measuring the volume and weight of the material.

In the embodiment of the present invention, the number, average area, and average aspect ratio of the pores appearing on the cross-section can be calculated by observing the graphite material with an electron microscope or the like. Specifically, the cross-section of the graphite material is processed by a cross-section polisher (CP) method. After the prepared cross-section is subjected to a flat milling treatment (45°, 3 minutes), the number, average area, and average aspect ratio of the pores are obtained by observing the cross-section with an FE-SEM.

At analysis of the obtained images, after binarization using an image analyzing software (IMAGE J 1.37), the area of each void (pore appearing on the cross-section) is calculated. The average area is obtained by dividing the total area of the pores by the number of pores. And, elliptic fitting is performed on each void and an aspect ratio is calculated based on the values of the major axis and the minor axis thereof.

In this connection, the aspect ratio means a value of (major-axis−minor-axis)/(major-axis) of the ellipse fitted void (pore appearing on the cross-section).

At the measurement of the number, average area, and average aspect ratio of the pores appearing on the cross-section, SEM is used as mentioned above. This is because a sufficient resolution for determining the shape of pores in a micron order can be obtained and also the pores and the particles can be clearly discriminated. The particle part is displayed as gray having a single density and the pore part is displayed as black in the case of deep pores and as white in the case of shallow pores, depending on the depth of the pores.

At the measurement of the number, average area, and average aspect ratio of the pores appearing on the cross-section, it may be advantageous to use a graphite material which is not filled with a resin. This is because, when the graphite material is filled with a resin, the open pores present inside the graphite material are sealed with the resin and thus correct number and shape of the pores cannot be determined.

The maximum pore diameter (major-axis or maximum size of the pores) is preferably 20 μm or less. When the maximum pore diameter is more than 20 μm, crack is developed along the pores at cutting, so that a thin pin is broken and a thin rib is cracked at cutting processing, which causes hole formation.

The maximum pore size (diameter) can be also measured from the cross-section observed with SEM in the same manner as described above. In this connection, the diameter of the pore obtained from the SEM observation of the cross-section is different from the diameter of the pore and the graphite particle obtained by means of a mercury porosimeter or the like. The former measures an actual size but the latter measures a diameter of the entrance part of a continuous pore.

The Shore hardness of the graphite material according to the embodiment of the present invention is preferably from 55 to 80. When the Shore hardness is less than 55, the chipping of the particles increases during electric discharging and attrition of the electrode becomes large, so that the resulting material is not suitable as an electrode for electric discharge. When the Shore hardness exceeds 80, the cutting resistance with a cutting tool increases at the time of cutting processing of an electrode, so that attrition of the cutting tool occurs rapidly and also the material might be easily broken or chipped.

The Shore hardness can be measured in accordance with Japan Industry Standards (JIS) Z2246. The contents of Japan Industry Standards (JIS) Z2246 are incorporated herein by reference in their entirety.

The specific resistance of the graphite material according to the embodiment of the present invention is preferably from 1000 to 2300 µΩcm, more preferably, 1000 to 2000 µΩcm. The specific resistance correlates with the Shore hardness of the graphite material and when the specific resistance is lowered, the graphite material is softened. In the case where the specific resistance is less than 1000 µΩcm, the Shore hardness becomes less than 55 and the attrition of the electrode becomes large. In this case, even when the material is processed in a fine pattern and used as an electrode, the processed accuracy cannot be transferred to a mold owing to severe attrition of the electrode. In the case where the specific resistance is more than 2300 µΩcm, when the material is used as an electrode for electric discharge, abnormal electric discharge may occur and unevenness tends to be generated on the processed surface of an article to be processed.

The specific resistance can be measured in accordance with JIS R7222, a fall-of-potential method. The contents of JIS R7222 are incorporated herein by reference in their entirety.

The graphite material according to the embodiment of the present invention can be suitably used especially as an electrode for electric discharging for finish processing. In rough processing, a mold is roughly processed and particularly fine processing is not provided. The graphite material according to the embodiment of the present invention can be processed in a fine and highly accurate pattern necessary in final finish processing.

The following will describe the process for producing the graphite material according to the embodiment of the present invention. The process for producing the graphite material according to the aspect, including adding a carbonaceous fine powder to pitch, kneading (mixing) them, performing thermal treatment (heating) at 400 to 500° C. while a volatile content is controlled to obtain a secondary raw material. Further, the process comprises pulverizing the obtained secondary raw material while controlling particle size so as not to over-pulverize it in a pulverizing machine having a function of removing a fine powder having smaller particle diameter, thereby a secondary raw material powder (particles) is obtained, and thereafter, molding the secondary raw material powder into a cuboid by cold isostatic press molding (CIP molding), burning at about 1000° C. in a burning furnace, and graphitizing at about 2500° C. in a graphitization furnace to obtain a graphite material according to the embodiment of the present invention.

The pitch for use in the embodiment of the present invention means a carboniferous or petroleum pitch and may be a mixture thereof. Of these raw materials, it may be advantageous to use a carboniferous pitch. In the case of the carboniferous pitch, optical anisotropy is difficult to develop (crystals are difficult to develop into a needle shape) and a high-strength and high-elastic modulus graphite material can be obtained.

The softening point of the pitch for use in the embodiment of the present invention may be preferably 50° C. or lower. When the softening point is higher than 50° C., the viscosity at the kneading increases and the production becomes difficult.

The carbonaceous fine powder for use in the embodiment of the present invention becomes a nucleus at development of a meso-phase and there can be used carbonaceous one such as carbon black, a graphite fine powder, a raw pitch coke fine powder, or a calcined pitch coke fine powder. The size of the fine powder may be preferably 5 µm or less. When a fine powder is more than 5 µm, it becomes difficult to control particle size distribution at pulverization of the secondary raw material obtained by kneading and a coarse side of the particle size distribution increases. The amount to be added to the pitch may be preferably from 3 to 10% by weight. When the fine powder is added in an amount more than 10% by weight, the viscosity of the pitch increases and the production becomes difficult. When the amount is less than 3% by weight, a mosaic structure of cokes cannot be sufficiently developed.

In the thermal treatment of the raw material described above, temperature and time are controlled so that the volatile content measured by JIS 8812 becomes from 6 to 12%, more preferably from 8 to 11%, thereby the secondary raw material is obtained. When the volatile content is less than 6%, since adhesion between the particles cannot be sufficiently obtained, only a graphite material having a low density can be obtained. When the volatile content is more than 12%, the amount of hydrocarbon gas generated from the inside during burning is large, so that the resulting material tends to be broken and also the accumulated gas forms large pores. The contents of JIS 8812 are incorporated herein by reference in their entirety.

The secondary raw material obtained by thermal treatment of the raw material described above is pulverized while controlling the particle size and fine powder has been removed from the resulting secondary raw material powder. The method for pulverization includes a method of using a pulverizing machine including classifying machine therein, a method of using a pulverizing plant including a pulverizing machine and a precise airflow classifying machine, a method of separately controlling particle size of a raw material, which has been pulverized in a pulverizing machine, in a precise airflow classifying machine, and the like.

In a graphite material using a secondary raw material powder containing a fine powder, gas generated during burning is difficult to release and the material tends to be broken. Furthermore, gas is accumulated in the material to form large pores.

With regard to the secondary raw material powder, median size (DP-50: a diameter at integral number of 50%) measured by means of a laser diffraction-type particle size meter is preferably from 5 to 10 µm, more preferably from 6 to 9 µm. Usually, the pores present between particles are frequently pores having a sharp edge and a large aspect ratio. In the case where the size of the particles is large, the size and shape of the pores show a synergistic effect and causes large decrease in elastic modulus. When the median size is more than 10 µm, the elastic modulus decreases and the graphite material according to the embodiment of the present invention cannot be obtained. Moreover, when the median size is less than 5 µm, the volatile content generated from a molded article of the secondary raw material powder during burning cannot be rapidly discharged to the outside of the material and thus the material tends to be broken. Furthermore, gas is accumulated in the material to form large pores.

Moreover, with regard to the secondary raw material powder, the range of the particle size distribution measured by means of a laser diffraction-type particle size meter is preferably from 1 μm to 80 μm. When the raw material of less than 1 μm is contained, the volatile content generated from a molded article of the secondary raw material powder during burning cannot be rapidly discharged to the outside of the material and thus the material tends to be broken. Furthermore, gas is accumulated in the material to form large pores. When particles of 80 μm or more are contained, flattened pores tends to be formed at an outer peripheral part of large particles and in the vicinity of interface of large particles themselves as well as the number of the pores decreases and the average cross-sectional area also decreases.

As the laser diffraction-type particle size meter, for example, LA-750 manufactured by HORIBA LTD. can be employed. In the measurement, the secondary raw material is dispersed by surface active agents such as tween 20.

The following will describe aspects of the present invention further in detail with reference to Examples but the present invention is not limited to the following Examples.

EXAMPLES

1. Production of Graphite Material

Examples 1 and 2

To 95 parts by weight of a carboniferous pitch having a softening point of 40° C. was added 5 parts by weight of calcined cokes pulverized into an average diameter of 2 μm, and the whole was kneaded. Thereafter, it was subjected to thermal treatment and the volatile content was adjusted under thermal treatment at 415° C. to obtain a secondary raw material. Then, the secondary raw material was pulverized by means of a pulverizing machine having an internal classifying machine so as not to reach over-pulverization, thereby a secondary raw material powder was obtained. Subsequently, after pressurization was performed at a pressure of 100 MPa by means of an isostatic press, the powder was burned to 1000° C. at a temperature-increasing rate of about 5° C./hour and graphitization was carried out at 2500° C.

In this connection, the secondary raw material powder obtained in the progress of the production did not contain powders having a diameter of 1 μm or less and powders having a diameter of 80 μm or more in a particle size distribution measured on a laser diffraction-type particle size distribution meter.

Table 1 shows characteristic values of the raw materials used and Tables 2 and 3 show characteristic values of the graphite materials obtained.

Comparative Example 1

A graphite material was produced in the same manner as in Examples 1 and 2 except that the pulverization was carried out by means of a pulverizing machine having no internal classifying machine. In this connection, the secondary raw material powder obtained in the progress of the production was not subjected to an operation of precise airflow classification or the like and did not contain powders having a diameter of 80 μm or more but contained powders having a diameter of 1 μm or less in an amount of 9.3% in a particle size distribution measured on a laser diffraction-type particle size distribution meter.

Table 1 shows characteristic values of the raw materials used and Tables 2 and 3 show characteristic values of the graphite materials obtained.

Comparative Example 2

To 35 parts by weight of a carboniferous pitch having a softening point of 80° C. was added 65 parts by weight of calcined cokes pulverized into an average diameter of 14 μm, and the whole was kneaded. Thereafter, it was subjected to thermal treatment and the volatile content was adjusted under thermal treatment at 250° C. to obtain a secondary raw material. Then, it was pulverized by means of a pulverizing plant fitted with a pulverizing machine and a precise airflow classification machine so as not to reach over-pulverization, thereby a secondary raw material powder was obtained. Subsequently, after pressurization was performed at a pressure of 100 MPa by means of an isostatic press, the powder was burned to 1000° C. at a temperature-increasing rate of about 5° C./hour and graphitization was carried out at 2500° C.

In this connection, the secondary raw material powder obtained in the progress of the production did not contain powders having a diameter of 1 μm or less but contained powders having a diameter of 80 μm or more in an amount of about 3% in a particle size distribution measured on a laser diffraction-type particle size distribution meter.

Table 1 shows characteristic values of the raw materials used and Tables 2 and 3 show characteristic values of the graphite materials obtained.

2. Characterization

The following items were measured to characterize the graphite materials obtained in the above.

(Bulk Density, Shore Hardness, Specific Resistance)

Test pieces having a size of φ 8×60 mm were cut out of the graphite materials prepared in the above and the bulk density, Shore hardness, and specific resistance were measured and/or calculated according to the above methods.

(Number, Average Area, Average Aspect Ratio of Pores Appearing on Cross-Section)

The number, average area, and average aspect ratio of the pores appearing a cross-section were calculated by the following procedures.

(a) Rough Grinding of Sample

The test piece prepared in the above was cut into a column having a thickness of about 5 mm and both surfaces of the sample were surface-fixed using a jig MODEL 623 manufactured by GATAN, INC. and a SiC water-proof abrasive paper #2400. Then, the sample was fixed on a brass sample table.

(b) CP Processing

CP processing was performed at an accelerating voltage of 6 kV using SM09010 manufactured by JEOL LTD.

(c) Milling

Ar milling treatment was performed at an accelerating voltage of 5 kV, 0.5 mA, a sample tilt angle of 45°, and a milling time of 3 minutes using a flat milling apparatus E-3200 manufactured by HITACHI HIGH-TECHNOLOGIES CORPORATION.

(d) FE-SEM observation

The sample prepared as above was observed at an accelerating voltage of 2 kV using an ultra-high resolution field emission-type scanning electron microscopy S-4800 manufactured by Hitachi High-Technologies Corporation.

(e) Image Analysis

The SEM image obtained in the above was analyzed using an analyzing software Image J 1.37 manufactured by National Institutes of Health. The observing magnification on this occasion was 2000-fold and, after noise-reduction treatment, binarization into the planer parts/void (pore) parts was performed. In this connection, the voids (pores) to be targeted for the analysis were those having a size exceeding 0.2 μm on which determination whether they were voids (pores) or not is possible.

On the void (pore) parts obtained by binarization using the image analyzing software (Image J), area measurement and optimum ellipse fitting were carried out and also the number was counted. Then, the number, average area, and average aspect ratio of the pores appearing on the cross-section were calculated from the values obtained by the above treatment.

(Compression Strength)

Measurement was performed in accordance with JIS R7222. The contents of JIS R7222 are incorporated herein by reference in their entirety.

(Elastic Modulus)

Measurement was performed in accordance with JIS R7222.

3. Performance Evaluation Test

The graphite material obtained in each of Examples and Comparative Examples was processed into a rod having a size of about φ 70×100 mm. The processing was performed on a lathe at a cutting depth of 1 mm and a advancing rate of 1 mm/rotation. The number of rotations of the lathe was set at 120 rpm. As a cutting tool, TNGG160408R-A3 manufactured by KYOCERA Corporation was used.

Thus obtained cutting chips were collected and applied to a multistage vibrating sieve and median size (DP-50: a diameter at integral number of 50%) was measured. In this connection, it is difficult to obtain an accurate value of median size by means of the multistage vibrating sieve since the number of sieves usable is limited but a value of median size was obtained by interpolation from the passed amount toward the mesh of the lowest sieve through which 50% by weight of the chips were passed and the passed amount toward the mesh of the highest sieve through which 50% by weight of the chips could not be passed. The processing characteristic of the graphite material was evaluated based on the obtained DP-50 values. It is determined that one having a smaller value thereof is excellent in processing characteristic and exhibits less cracking and chipping. Table 3 shows evaluation results of processing characteristic on the samples of Examples and Comparative Examples.

TABLE 1

| | Softening point of pitch | Carbonaceous fine powder | Median size of carbonaceous fine powder | % by weight of pitch | % of volatile content of second raw material | Median size of secondary raw powder | Minimum particle size of secondary raw powder | Maximum particle size of secondary raw powder |
|---|---|---|---|---|---|---|---|---|
| Example 1 | 40° C. | Pitch cokes | 2 μm | 95% | 10.3 | 7.3 μm | 1.5 μm | 30 μm |
| Example 2 | 40° C. | Pitch cokes | 2 μm | 95% | 9.8 | 7.7 μm | 1.5 μm | 34 μμ |
| Comparative Example 1 | 40° C. | Pitch cokes | 2 μm | 95% | 10.3 | 4.0 μm | 0.1 μm | 26 μm |
| Comparative Example 2 | 80° C. | Pitch cokes | 14 μm | 35% | 12.0 | 22 μm | 1.5 μm | 200 μm |

TABLE 2

| | Number of pores/ 6000 μm$^2$ | Ratio of total area of pores to whole (%) | Average area of pores μm$^2$ | Average aspect ratio of fitted ellipse |
|---|---|---|---|---|
| Example 1 | 364 | 17.94 | 2.97 | 0.50 |
| Example 2 | 336 | 19.97 | 3.58 | 0.50 |
| Comparative Example 1 | 228 | 24.35 | 6.57 | 0.41 |
| Comparative Example 2 | 44 | 8.70 | 11.95 | 0.64 |

TABLE 3

| | Bulk density g/cm$^3$ | Compression strength MPa | Elastic modulus GPa | Shore hardness | Specific resistance μΩcm | Processing characteristic μm |
|---|---|---|---|---|---|---|
| Example 1 | 1.85 | 92 | 12.7 | 67 | 1850 | 820 |
| Example 2 | 1.82 | 105 | 11.4 | 63 | 1790 | 890 |
| Comparative Example 1 | 1.79 | 128 | 11.2 | 68 | 1520 | 1010 |
| Comparative Example 2 | 1.76 | 83 | 8.2 | 57 | 1630 | 1310 |

As shown in Table 3, since the graphite materials of Examples 1 and 2 belonging to the range of the embodiment of the present invention result in small cutting chips as compared with Comparative Examples 1 and 2, it is realized that more precise processing is possible and thus they are excellent in processing characteristic.

Moreover, from the cross-sectional photographs shown in FIGS. 5A to 5C and FIGS. 6A to 6C, it is realized that a large number of round pores relatively small in size are homogeneously distributed in the graphite materials according to the embodiment of the present invention. Contrarily, it is realized that the number of round pores are small and a large number of relatively large pores are present in the graphite materials of Comparative Examples shown in FIGS. 7A to 7C and FIGS. 8A to 8C.

The graphite materials according to the embodiment of the present invention hardly generate cracking, chipping, and the like even when fine processing is applied. Thus, the graphite material can be utilized as electrodes for electric discharging having fine patterns, fine holes, pins, ribs, or the like, jigs for electronic parts, elastic bodies, and the like.

Second Embodiment

The following will describe an elastic body which is an exemplary application of the graphite material according to one aspect of the present invention. The elastic body made of the graphite material is suitable for use in various devices for chemical synthesis, aerospace environment utilizing devices, nuclear reactors, nuclear fusion reactors, high-temperature furnaces for thermal treatment, sensors, differential thermal balances, chemical pumps, parts for engines. Particularly, in the case where the elastic body made of the graphite material according to one aspect of the present invention has a plate-shape, the elastic body made of the graphite material may be applied with a load in a thickness direction thereof and may be used as, for example, a diaphragm, a leaf spring, a conical spring, and the like in a pressure sensor, a load cell, and the like. In the case where an elastic body made of the graphite material has a string-shape, the elastic body made of the graphite material may be applied with a load in a thickness direction thereof or in a twisting direction thereof, may have not only a linear-shape but also a spiral-shape, and may be used as a coil spring, a flat-coiled spring, and the like.

Figure 9:
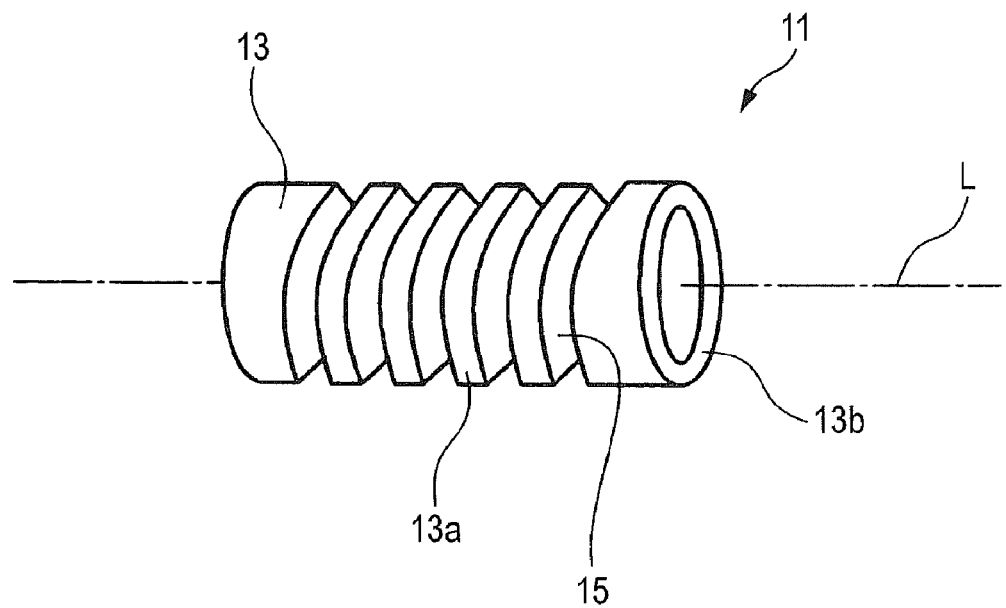
FIG. 9 shows a perspective view of an elastic body made of a graphite material.

FIG. 9 shows a perspective view of the elastic body made of a graphite material. Hereinafter, a coil spring 11 will be described as an example of the elastic body made of the graphite material according to one aspect of the present invention. The coil spring 11 is obtained by cutting (carving) an outer periphery 13a of a cylindrical spring base material 13 made of a graphite material with a spiral cutting groove 15 to form a coil spring shape as an axis line L being centered. Namely, the coil spring 11 is formed into a coil spring shape in which a rod having a square cross-section is spirally wound. In the usual coil spring formed by winding a rod, an edge part (seat) 13b should be processed into flat. However, in the case of the coil spring 11, since the flat cylinder edge part 13b of the cylindrical spring base material 13 can be utilized as it is, the flattening process can be easily performed. In this connection, if the cylindrical spring base material 13 is formed in a cone shape, a conical coil spring can be obtained by a similar manner.

Figure 10:
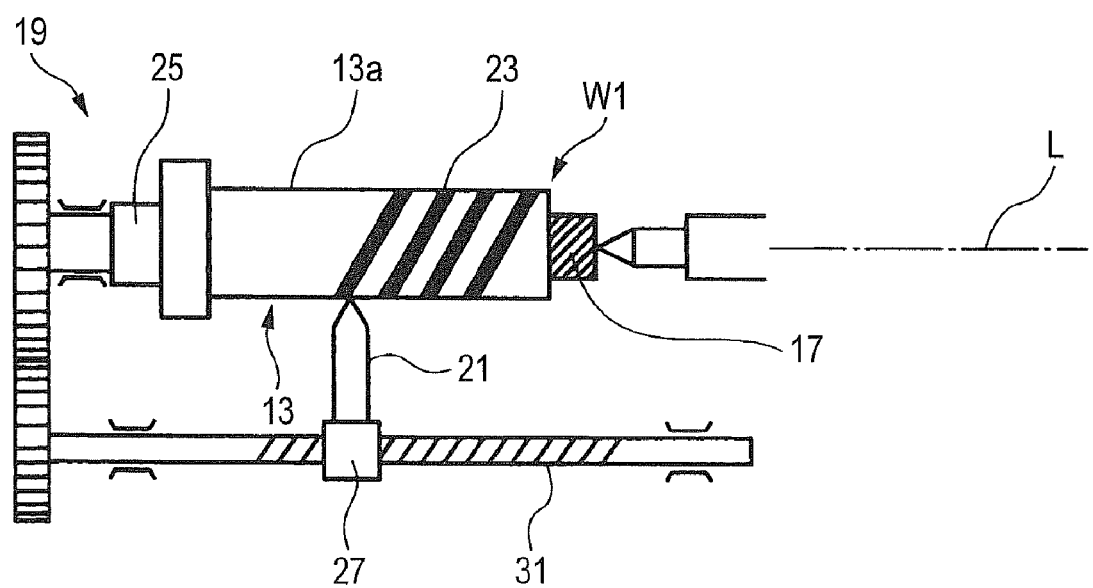
FIG. 10 shows an example of a lathe used in producing the elastic body made of a graphite material.
Figure 11A:
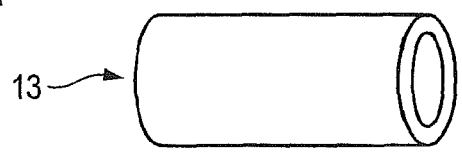
FIGS. 11A to 11E show diagrams of a process for producing the elastic body made of a graphite material.

The following will describe the process for producing the coil spring 11. FIG. 10 shows an example of a lathe used in producing the elastic body made of a graphite material. FIGS. 11A to 11E show diagrams of a process for producing the elastic body made of a graphite material. The process for producing the elastic body made of the graphite material involves the production of the cylindrical spring base material 13 which is made of the graphite material as shown in FIG. 11A. It is noted that the graphite material itself is produced as explained in the first embodiment.

Figure 11B:
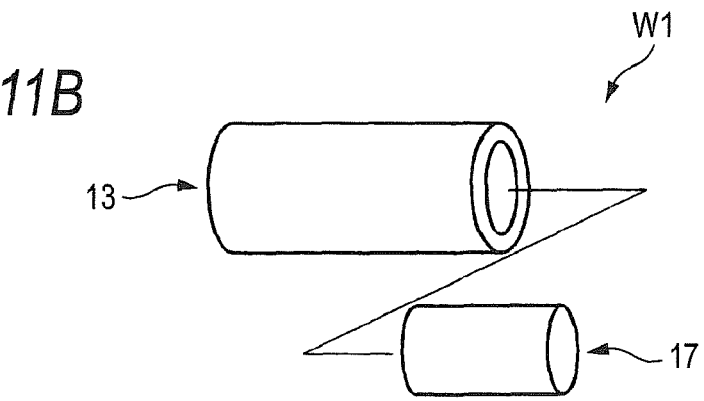

As shown in FIG. 11B, a columnar body 17 is fixed to an inner periphery of the cylindrical spring base material 13 with an adhesive to obtain a workpiece W1. The columnar body 17 may be made of a graphite material. Any adhesive may be used which is thermally decomposable and vaporizable. For example, α-cyanoacrylate adhesive (instant adhesive) is preferably used. The α-cyanoacrylate adhesive is depolymerized into monomers by heating to the range from 200 to 300° C. Therefore, the adhesive can be thermally decomposed without oxidizing the graphite material since an oxidization onset temperature of the graphite material is around 400° C.

Figure 11C:
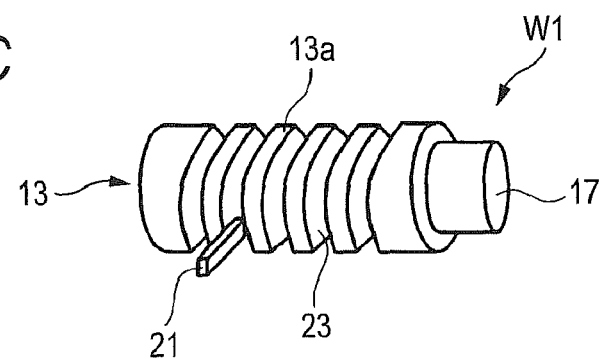

Then, using a lathe 19 shown in FIG. 10, while rotating the workpiece W1 about the axis line L, a cutting tool (turning tool) 21 is relatively displaced in parallel to the axis line L to cut the cylindrical spring base material 13 with a spiral groove 23 which reaches the columnar body 17, as shown in FIG. 11C. Specifically, as if the screw-thread cutting would be performed on the workpiece W1, the workpiece W1 is rotated with a main axis 25 as a rotation center. The cutting tool 21 is displaced from a cutting tool holder 27 along a guide axis 31 parallel to the main axis 25 with synchronizing the rotation of the workpiece W1 while the cutting tool 21 is brought into contact with a peripheral of the workpiece W1. Accordingly, the spiral groove 23 is formed. In this connection, the columnar body 17 serves as a reinforcing member of the cylindrical spring base material 13 and strength against crushing toward the inside of the cylindrical spring base material 13 in a radial direction is enhanced, so that it becomes possible to perform a spiral groove cutting processing to the outer periphery 13a of the cylindrical spring base material 13.

Figure 11D:
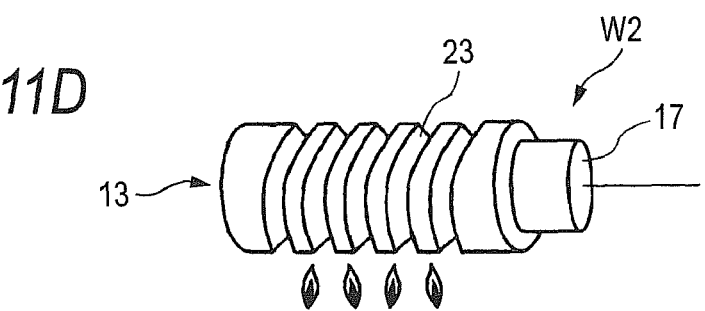
Figure 11E:
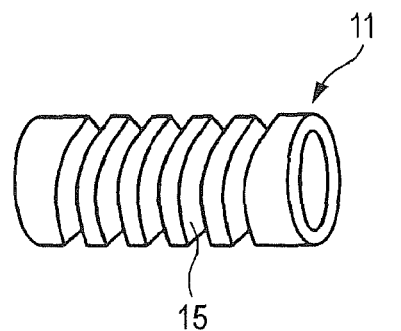

After a workpiece W2 having the spiral groove 23 formed as shown in FIG. 11D is obtained, the workpiece W2 with the spiral groove 23 is then subjected to a thermal treatment at a temperature ranging from the decomposition temperature of the adhesive or higher to the oxidation temperature of the graphite material or lower. Then, the columnar body 17 is removed. Thus, the coil spring 11 shown in FIG. 11E is produced.

Consequently, according to the coil spring 11, it is formed using a graphite material comprising: a plurality of graphite particles; and a plurality of pores. The plurality of graphite particles and the plurality of pores form a microstructure, and a cross-section of the microstructure has a number of the pores that is 250 or more per 6000 $\mu m^2$, an average area of the pores on the cross-section is 5 $\mu m^2$ or less, and an average aspect ratio of the pores on the cross-section is 0.55 or less. Therefore, fine graphite particles and pores are homogeneously distributed and the elastic body has thermal resistance, corrosion resistance, and cutting ability with a high strength and a high elastic modulus and further, dimensional accuracy can be enhanced. As a result, the coil spring 11 remedies the defect of the carbon material, does not broken even after repeated use in various devices for chemical synthesis, aerospace environment-utilizing devices, nuclear reactors, nuclear fusion reactors, and the like, can be also stably utilized under a situation where a metal spring cannot be used, and have a long operating life.

Moreover, the method for producing the coil spring 11 includes: forming a cylindrical spring base material 13 using the above graphite material; obtaining a workpiece by fixing a columnar body, to an inner periphery of the cylindrical spring base material 13 with an adhesive; relatively displacing a cutting tool in parallel to a center axis of the cylindrical spring base material 13 while rotating the workpiece W1 about the center axis to cut the cylindrical spring base material 13 with a spiral groove 23 which reaches the columnar body 17; heating the workpiece W2 cut with the spiral groove 23 to depolymerize the adhesive; and removing the columnar body 17 from the cylindrical spring base material 13. Therefore, the spiral groove cutting processing can be performed to the outer periphery 13a of the cylindrical spring base material 13 while using the columnar body 17 as a reinforcing member of the cylindrical spring base material 13 without crushing the cylindrical spring base material 13 inward in a radial direction to thereby obtain the elastic body made of the graphite material having a coil shape.

The following examples provide a more detailed description of aspects of the present invention. The present invention is, however, not limited to the following examples. In the second embodiment, the Examples 1 and 2, and Comparative Examples 1 and 2 described in the first embodiment are used for producing a coil spring. Therefore, the details of these examples of the graphite material will be omitted.

Examples

1. Production of Coil Spring

A graphite material of each of Examples and Comparative Examples is processed into a hollow cylindrical shape having a thickness of 2.5 mm, which is used as a cylindrical spring base material 13 (FIG. 11A). A columnar body 17 is adhered to an inner periphery of the cylindrical spring base material 13 with α-cyanoacrylate to form a workpiece W1 wherein the cylindrical spring base material 13 and the columnar body 17 are integrated (FIG. 11B). Using a lathe 19 shown in FIG. 10, a spiral groove 23 having a width of 1 mm and a pitch of 2 mm is formed at the workpiece W1 (FIG. 11C). The resultant workpiece W2 is subjected to a thermal treatment at 330° C. and then the columnar body 17 is removed (FIG. 11D). Accordingly, a coil spring 11 is obtained (FIG. 11E).

2. Evaluation of Coil Spring

No apparent difference was visually confirmed not only on the coil springs of Examples (coil springs using the graphite materials of Examples 1 and 2) but also on the coil springs of Comparative Examples (coil springs using the graphite materials of Comparative Examples 1 and 2). However, as also recognized from the cross-sectional photographs of the graphite materials shown in FIG. 5A to FIG. 5C, FIG. 6A to FIG. 6C, FIG. 7A to FIG. 7C, and FIG. 8A to FIG. 8C, a large number of relatively small-sized round pores are homogeneously distributed in the graphite materials of Examples, while round pores are small in number and a large number of relatively large pores are present in the graphite materials of Comparative Examples. Therefore, the coil springs made of the graphite materials of Examples and the coil springs made of the graphite materials of Comparative Examples are significantly different in resistance against stress. Specifically, in the case of the coil springs of Comparative Examples, chipping occurred during the compression from the natural-length state to the most compressed state so that the springs were broken only by repeating expansion and compression several times. Contrarily, in the case of the coil springs of Examples, chipping did not occur even when expansion and compression between the natural-length state and the most compressed state were repeated, and therefore, the springs were not broken even when the expansion and compression were repeated 1000 times.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A graphite material comprising:
a plurality of graphite particles; and
a plurality of pores,
wherein the plurality of graphite particles and the plurality of pores form a microstructure, and
wherein a cross-section of the microstructure has a number of the pores that is 250 or more per 6000 $\mu m^2$, an average area of the pores on the cross-section is 5 $\mu m^2$ or less, and an average aspect ratio of the pores on the cross-section is 0.55 or less.

2. The graphite material according to claim 1, wherein said graphite material has a bulk density of from 1.78 to 1.86 $g/cm^3$.

3. The graphite material according to claim 2, wherein a maximum long axis of the pores is 20 $\mu m$ or less.

4. The graphite material according to claim 3, wherein said graphite material has a shore hardness of from 55 to 80.

5. The graphite material according to claim 1, wherein said graphite material is configured to be used for electric discharging.

6. The graphite material according to claim 1, wherein a maximum long axis of the pores is 20 $\mu m$ or less.

7. The graphite material according to claim 1, wherein said graphite material has a shore hardness of from 55 to 80.

8. The graphite material according to claim 1, wherein said graphite material has an electric resistance of from 1000 to 2300 $\mu\Omega cm$.

9. A graphite material comprising:
a plurality of graphite particles; and
a plurality of pores,
wherein the plurality of graphite particles and the plurality of pores form a microstructure,
wherein a cross-section of the microstructure has a number of the pores that is 250 or more per 6000 $\mu m^2$, an average area of the pores on the cross-section is 5 $\mu m^2$ or less, and an average aspect ratio of the pores on the cross-section is 0.55 or less,
wherein said graphite material has a bulk density of from 1.78 to 1.86 $g/cm^3$,
wherein a maximum long axis of the pores is 20 $\mu m$ or less,
wherein said graphite material has a shore hardness of from 55 to 80, and
wherein said graphite material has an electric resistance of from 1000 to 2300 $\mu\Omega cm$.

10. A method for producing a the graphite material of claim 1, said method comprising:
mixing carbonaceous particles and pitch;
heating the mixed carbonaceous particles and the pitch to obtain a secondary raw material while controlling a volatile content thereof;
pulverizing the secondary raw material to obtain secondary raw material particles;
molding the secondary raw material particles;
burning the molded secondary raw material particles; and
graphitizing the burned secondary raw material particles.

11. The method according to claim 10, wherein a softening point of the pitch is 50 degree C. or less.

12. The method according to claim 10, wherein a size of the carbonaceous particles is 5 $\mu m$ or less.

13. The method according to claim 10, wherein an amount of the carbonaceous particles mixed with the pitch is from 3 to 10% by weight.

14. The method according to claim 10, wherein the heating of the mixed carbonaceous particles and the pitch is performed so that a volatile content is from 6 to 12%.

15. The method according to claim 10, wherein a median size of the secondary raw material particles is from 5 to 10 $\mu m$.

16. The method according to claim 10, wherein sizes of the secondary raw material particles are from 1 to 80 $\mu m$.

17. An elastic body made of a graphite material, the graphite material comprising:

a plurality of graphite particles; and
a plurality of pores,
wherein the plurality of graphite particles and the plurality of pores form a microstructure, and
wherein a cross-section of the microstructure has a number of the pores that is 250 or more per 6000 μm², an average area of the pores on the cross-section is 5 μm² or less, and an average aspect ratio of the pores on the cross-section is 0.55 or less.

18. The elastic body according to claim 17,
wherein the elastic body is formed by cutting an outer periphery of a cylindrical base material made of the graphite material with a spiral groove having a center axis same as that of the cylindrical base material to form a coil spring shape.

19. A method for producing an elastic body, the method comprising:
producing a cylindrical base material with using a graphite material, the graphite material comprising: a plurality of graphite particles; and a plurality of pores, wherein the plurality of graphite particles and the plurality of pores form a microstructure, and wherein a cross-section of the microstructure has a number of the pores that is 250 or more per 6000 μm², an average area of the pores on the cross-section is 5 μm² or less, and an average aspect ratio of the pores on the cross-section is 0.55 or less;
obtaining a workpiece by fixing a columnar body to an inner periphery of the cylindrical base material with an adhesive;
relatively displacing a cutting tool in parallel to a center axis of the cylindrical base material while rotating the workpiece about the center axis to cut the cylindrical base material with a spiral groove which reaches the columnar body;
heating the workpiece cut with the spiral groove to depolymerize the adhesive; and
removing the columnar body from the cylindrical base material.

* * * * *